(12) United States Patent
Ueda et al.

(10) Patent No.: US 8,957,675 B2
(45) Date of Patent: Feb. 17, 2015

(54) ROTATION ANGLE DETECTION DEVICE

(75) Inventors: Takeshi Ueda, Kashiba (JP); Hayato Komatsu, Ama-gun (JP); Minoru Sentoku, Kashiba (JP)

(73) Assignee: JTEKT Corporation, Osaka (JP)

( * ) Notice: Subject to any disclaimer, the term of this patent is extended or adjusted under 35 U.S.C. 154(b) by 307 days.

(21) Appl. No.: 13/579,006

(22) PCT Filed: Feb. 23, 2011

(86) PCT No.: PCT/JP2011/054002
§ 371 (c)(1),
(2), (4) Date: Aug. 14, 2012

(87) PCT Pub. No.: WO2011/108421
PCT Pub. Date: Sep. 9, 2011

(65) Prior Publication Data
US 2012/0319680 A1    Dec. 20, 2012

(30) Foreign Application Priority Data

Mar. 3, 2010    (JP) ................................. 2010-046719

(51) Int. Cl.
*G01B 7/30*    (2006.01)
*G01D 5/245*    (2006.01)

(52) U.S. Cl.
CPC .................................. *G01D 5/2451* (2013.01)
USPC .................. 324/207.25; 324/207.12; 324/174

(58) Field of Classification Search
CPC .................................................... G01D 5/2451
USPC ............. 324/207.2, 207.21, 207.25, 173–174
See application file for complete search history.

(56) References Cited

U.S. PATENT DOCUMENTS

| 5,461,311 | A | 10/1995 | Nakazato et al. |
| 6,172,499 | B1* | 1/2001 | Ashe ..................... 324/207.12 |
| 6,424,147 | B1* | 7/2002 | Kato et al. ............ 324/207.2 |
| 2002/0124663 | A1 | 9/2002 | Tokumoto et al. |

(Continued)

FOREIGN PATENT DOCUMENTS

| CN | 1776354 A | 5/2006 |
| CN | 102221322 A | 10/2011 |

(Continued)

OTHER PUBLICATIONS

Apr. 12, 2011 International Search Report issued in International Application No. PCT/JP2011/054002 (with translation).

*Primary Examiner* — Arleen M Vazquez
*Assistant Examiner* — Robert P Alejnikov, Jr.
(74) *Attorney, Agent, or Firm* — Oliff PLC

(57) ABSTRACT

Upon detecting a peak value from output signals of one of either a first or a second magnetic sensor, an rotation angle computation device identifies, on basis of an amplitude compensation table corresponding to the one magnetic sensor for which the peak value was detected, a pole number of a magnetic pole sensed by the magnetic sensor. Then, based on the identified pole number and a magnetic pole identification table, a pole number of a magnetic pole sensed by the other magnetic sensor is identified. The pole numbers of the magnetic poles sensed by the respective magnetic sensors are thus identified, and the rotation angle computation device compensates the output signals of the respective magnetic sensors using amplitude compensation gains corresponding to the sensed magnetic poles (magnetic pole pair).

6 Claims, 8 Drawing Sheets

(56) References Cited

U.S. PATENT DOCUMENTS

| | | |
|---|---|---|
| 2006/0103374 A1 | 5/2006 | Shiraki et al. |
| 2008/0272723 A1 | 11/2008 | Rudel et al. |
| 2008/0284421 A1 | 11/2008 | Hatanaka et al. |
| 2010/0045275 A1 | 2/2010 | Frachon |
| 2011/0248709 A1 | 10/2011 | Shimizu et al. |
| 2013/0035896 A1* | 2/2013 | Ueda et al. .................. 702/151 |

FOREIGN PATENT DOCUMENTS

| | | |
|---|---|---|
| JP | A-6-323867 | 11/1994 |
| JP | A-2002-257649 | 9/2002 |
| JP | A-2003-83823 | 3/2003 |
| JP | A-2008-286709 | 11/2008 |
| JP | A-2009-503462 | 1/2009 |
| WO | WO 01/55668 A1 | 8/2001 |

* cited by examiner

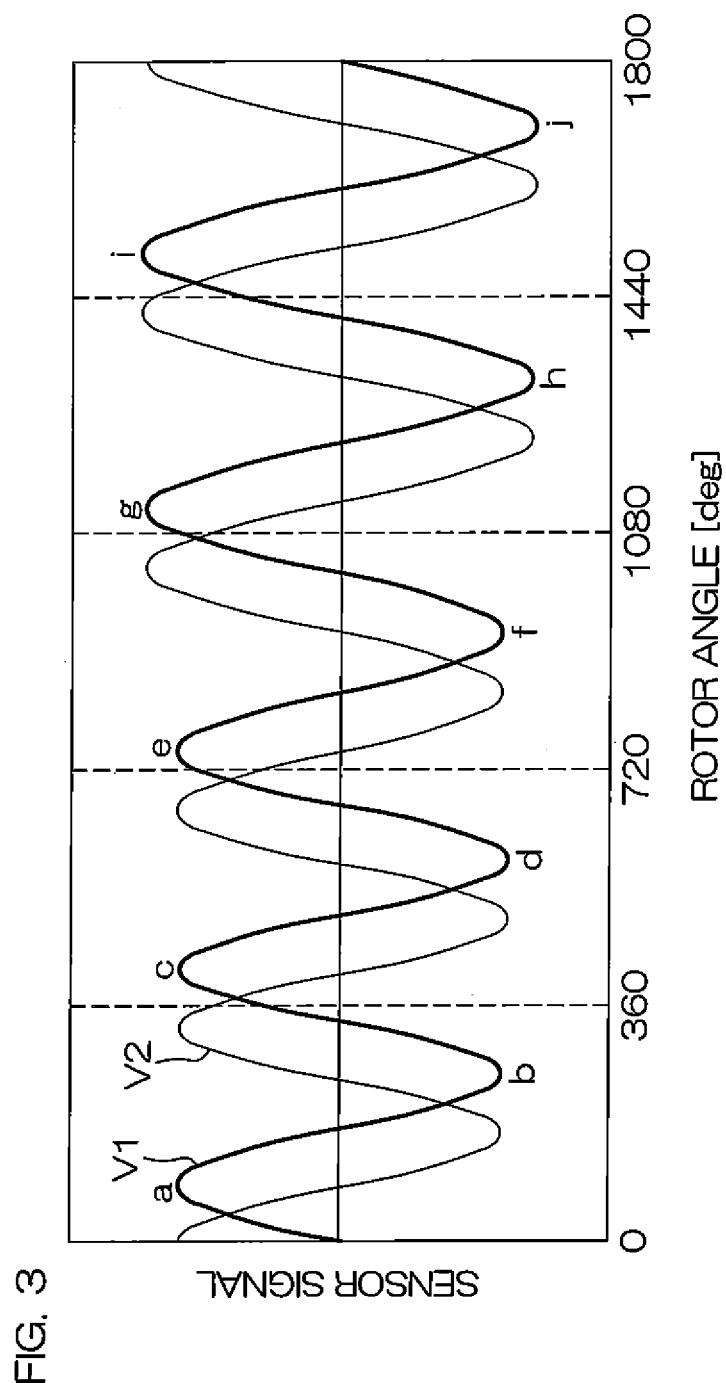

FIG. 4A

| POLE NUMBER | PEAK VALUE | ANGULAR WIDTH | COMPENSATION GAIN G1 |
|---|---|---|---|
| 0 | +490 | 170deg | 500/490 |
| 1 | -485 | 165deg | 500/485 |
| 2 | +480 | 160deg | 500/480 |
| 3 | -490 | 170deg | 500/490 |
| 4 | +485 | 165deg | 500/485 |
| 5 | -510 | 190deg | 500/510 |
| 6 | +520 | 195deg | 500/520 |
| 7 | -520 | 195deg | 500/520 |
| 8 | +525 | 200deg | 500/525 |
| 9 | -510 | 190deg | 500/510 |

FIG. 4B

| POLE NUMBER | PEAK VALUE | ANGULAR WIDTH | COMPENSATION GAIN G2 |
|---|---|---|---|
| 0 | +490 | 170deg | 500/490 |
| 1 | -485 | 165deg | 500/485 |
| 2 | +480 | 160deg | 500/480 |
| 3 | -490 | 170deg | 500/490 |
| 4 | +485 | 165deg | 500/485 |
| 5 | -510 | 190deg | 500/510 |
| 6 | +520 | 195deg | 500/520 |
| 7 | -520 | 195deg | 500/520 |
| 8 | +525 | 200deg | 500/525 |
| 9 | -510 | 190deg | 500/510 |

ROTATION ANGLE DETECTION DEVICE

TECHNICAL FIELD

The present invention relates to a rotation angle detection device that detects a rotation angle of a rotating body, such as a rotor of a brushless motor.

BACKGROUND ART

To control a brushless motor used in an electric power steering apparatus, etc., an electric current must be supplied to a stator coil in accordance with an rotation angle of a rotor. There is thus known a rotation angle detection device that uses a detection rotor that rotates in accordance with rotation of the brushless motor to detect the rotation angle of the rotor of the brushless motor. Specifically, as shown in FIG. 10, a detection rotor 101 (hereinafter referred to as the "rotor 101") includes a cylindrical magnet 102 having a plurality of magnetic pole pairs corresponding to magnetic pole pairs provided in a rotor of a brushless motor. At a periphery of the rotor 101, two magnetic sensors 121 and 122 are disposed at a predetermined angular interval centered at a central rotation axis of the rotor 101. Sinusoidal signals with a predetermined phase difference are output from the respective magnetic sensors 121 and 122. The rotation angle of the rotor 101 (rotation angle of the rotor of the brushless motor) is detected based on the two sinusoidal signals.

In the present example, the magnet 102 has five magnetic pole pairs. That is, the magnet 102 has ten magnetic poles disposed at equiangular intervals. Each magnetic pole is disposed at an angular interval of 36° (180° as electrical angle) centered at the central rotation axis of the rotor 101. Also, the two magnetic sensors 121 and 122 are disposed at an angular interval of 18° (90° as electrical angle) centered at the central rotation axis of the rotor 101.

A direction indicated by an arrow in FIG. 10 shall be deemed to be a positive direction of rotation of the detection rotor 101. It shall also be deemed that the rotation angle of the rotor 101 increases when the rotor 101 is rotated in the positive direction, and the rotation angle of the rotor 101 decreases when the rotor 101 is rotated in the opposite direction. The sinusoidal signals V1 and V2, with each of which a single cycle is a period in which the rotor 101 rotates by an angle corresponding to a single magnetic pole pair (72° (360° as electrical angle)), are output from the respective magnetic sensors 121 and 122 as shown in FIG. 11.

Here, an absolute rotation angle of the rotor 101 from a predetermined reference position shall be deemed to be the absolute rotation angle (mechanical angle) $\theta_A$ of the rotor 101. An angular range of a single rotation of the rotor 1 shall be divided into five divisions corresponding to the five magnetic pole pairs, and an angle of the rotor 101 with a start position of each division being expressed as 0° and an end position being expressed as 360° shall be deemed to be a relative rotation angle $\theta_R$ of the rotor 101. In the present case, the ten magnetic poles are equal in angular width and thus the relative rotation angle $\theta_R$ of the rotor 101 matches the electrical angle of the rotor of the brushless motor.

Here, it shall be deemed that the output signal V1=A1·sin $\theta_R$ is output from the first magnetic sensor 121 and the output signal V2=A2·cos $\theta_R$ is output from the secondmagnetic sensor 122. A1 and A2 are amplitudes. If the amplitudes A1 and A2 of the two output signals V1 and V2 are deemed to be equal, the relative rotation angle $\theta_R$ of the rotor 101 can be determined based on the following formula (1) using the two output signals V1 and V2.

$$\theta_R = \tan^{-1}(\sin\theta_R/\cos\theta_R) = \tan^{-1}(V1/V2) \qquad (1)$$

The brushless motor is controlled using the relative angle $\theta_R$ thus determined.

The absolute rotation angle $\theta_A$ of the rotor 101 can be determined, for example, based on the following formula (2) using the relative angle $\theta_R$.

$$\theta_A = \{\theta_R + 360 \times (n-1)\}/5 \ (n=1, 2, \ldots 5) \qquad (2)$$

CITATION LIST

Patent Literature

Patent Document 1: Japanese Published Unexamined Patent Application No. 2003-83823
Patent Document 2: Japanese Published Unexamined Patent Application No. 2002-257649.

SUMMARY OF THE INVENTION

Technical Problem

In the conventional rotation angle detection device described above, error occurs in the detection of the rotation angle of the rotor 101 because the amplitudes of the output signals V1 and V2 of the respective magnetic sensors 121 and 122 vary according to magnetic pole due to variation of magnetic force according to magnetic pole, etc. The relative angle $\theta_R$ of the rotor 101 is thus computed after performing compensation (amplitude compensation) of the output signals V1 and V2 of the respective magnetic sensors 121 and 122 in a manner such that the amplitudes of the output signals V1 and V2 of the respective magnetic sensors 121 and 122 are made equal in accordance with the absolute rotation angle $\theta_A$ of the rotor 101.

In the case where the magnetic force varies according to magnetic pole, gains for compensation of the output signals V1 and V2 of the respective magnetic sensors 121 and 122 must be changed at each single cycle or half cycle of the relative angle (electrical angle). After a single rotation of the rotor 101, the magnetic poles sensed by the respective magnetic sensors 121 and 122 can be identified and thus amplitude compensation can be performed in accordance with the magnetic poles (magnetic pole pair) sensed by the respective magnetic sensors 121 and 122. However, immediately after startup of the brushless motor, the magnetic poles sensed by the respective magnetic sensors 121 and 122 cannot be identified and thus amplitude compensation and phase compensation that are in accordance with the magnetic poles sensed by the respective magnetic sensors 121 and 122 cannot be performed.

An object of the present invention is to provide an rotation angle detection device that enables a magnetic pole sensed by a magnetic sensor to be identified at an early stage immediately after start of rotation of a rotating body.

Solution to the Problem

An rotation angle detection device according to the present invention includes a detection rotor (1, 1A, 1B) rotating in accordance with rotation of a rotating body (10) and provided with a plurality of magnetic poles (M0 to M9) and first and second magnetic sensors (21, 22) respectively outputting first and second alternating signals (V1, V2), having a predetermined phase difference, in accordance with the rotation of the detection rotor and detects an rotation angle of the rotating body based on the output signals of the magnetic sensors, the detection rotor has magnetic pole characteristics such that an extremum of each alternating signal with respect to at least one magnetic pole among the plurality of magnetic poles differs distinguishably from any of the extrema of the alternating signal with respect to the other magnetic poles, and the rotation angle detection device further includes a detection unit (20, S2) configured to detect the extrema of the respective alternating signals, a compensation unit (20, S4 to S6) configured to identify the magnetic poles sensed by the respective magnetic sensors based on the extrema detected by the detecting unit and extrema data set in advance and compensating amplitudes of the respective alternating signals in accordance with the identified magnetic poles, and an rotation angle computation unit (20, S7 to S9) configured to compute the rotation angle of the rotating body based on the respective amplitude-compensated alternating signals. The alphanumeric characters in parenthesis express corresponding components, etc., in preferred embodiments described below. However, this is not intended for the present invention to be interpreted as being limited to the preferred embodiments.

With the above arrangement, the magnetic poles sensed by the respective magnetic sensors are identified based on the extrema detected by the detection unit and the extrema data that are set in advance and the amplitudes of the respective alternating signals are compensated in accordance with the identified magnetic poles. The rotation angle of the rotating body is then computed based on the respective amplitude-compensated alternating signals.

The detection rotor has magnetic pole characteristics such that the extremum of each alternating signal with respect to at least one magnetic pole among the plurality of magnetic poles differs distinguishably from any of the extrema of the alternating signal with respect to the other magnetic poles. For example, in a case where the extremum of each alternating signal with respect to one magnetic pole (hereinafter referred to as the "reference magnetic pole") differs distinguishably from any of the extrema of the alternating signal with respect to the other magnetic poles, when after the start of rotation of the rotating body, the extremum corresponding to the reference magnetic pole is detected by the detection unit, the magnetic pole sensed by the magnetic sensor outputting the extremum can be identified at that point. Also, the magnetic pole sensed by the other magnetic sensor can be identified from the positions and angular interval of the respective magnetic sensors, the arrangement of the detection rotor, etc. The possibility to identify the magnetic poles sensed by the respective magnetic sensor before the detection rotor completes a single rotation after the start of rotation of the rotating body is thus made high. That is, the magnetic poles sensed by the respective magnetic sensors can be identified at an early stage immediately after the start of rotation of the rotating body.

The detection rotor may have magnetic pole characteristics such that the extremum of each alternating signal with respect to each magnetic pole provided in the detection rotor differs distinguishably from any of the extrema of the alternating signal with respect to the other magnetic poles. With this arrangement, the magnetic poles sensed by the respective magnetic sensors can be identified at a point at which, after the start of rotation of the rotating body, the extremum with respect to any magnetic pole is first detected. The magnetic poles sensed by the respective magnetic sensors can thus be identified at an early stage immediately after the start of rotation of the rotating body.

The detection rotor may have a plurality of magnetic poles disposed in a circumferential direction and have the magnetic pole characteristics by magnetic pole area differences being provided among the magnetic poles. Also, the detection rotor may have a plurality of magnetic poles provided at equiangular intervals in the circumferential direction and have the magnetic pole characteristics by differences in length in a rotation axis direction of the detection rotor being provided among the magnetic poles. Also, the detection rotor may have a plurality of magnetic poles that are equal in length in the rotation axis direction of the detection rotor provided at equiangular intervals in the circumferential direction and have the magnetic pole characteristics by differences in magnitude of magnetic force being provided among the magnetic poles.

In a preferred embodiment of the present invention, the detection rotor has a plurality of magnetic poles disposed in a circumferential direction and has the magnetic pole characteristics by angular width differences being provided among the magnetic poles, the rotation angle computation unit includes a phase compensation unit, and the phase compensation unit includes a unit configured to compute a relative angle of the detection rotor from the respective amplitude-compensated alternating signals and compensate the computed relative angle to a relative angle that is in accordance with the angular width of the magnetic pole sensed by one of the magnetic sensors determined in advance.

With this arrangement, the relative angle of the detection rotor is computed from the respective amplitude-compensated alternating signals. The computed relative angle is compensated to a relative angle that is in accordance with the angular width of the magnetic pole sensed by one of the magnetic sensors determined in advance. The rotation angle of the rotating body can thereby be computed even in a case where angular width differences are provided among the magnetic poles.

The above and yet other objects, features, and effects of the present invention shall be made clearer by the following description of the preferred embodiments with reference to the attached drawings.

BRIEF DESCRIPTION OF THE DRAWINGS

FIG. 3 is a schematic view of an output signal waveform of a first magnetic sensor and an output signal waveform of a second magnetic sensor.

FIG. 4 is a schematic view of contents of an amplitude compensation table corresponding to the first magnetic sensor, and FIG. 4B is a schematic view of contents of an amplitude compensation table corresponding to the second magnetic sensor.

DESCRIPTION OF EMBODIMENTS

Preferred embodiments with which the present invention is applied to an rotation angle detection device for detecting an rotation angle of a rotor of a brushless motor shall now be described in detail with reference to the attached drawings.

Figure 1:
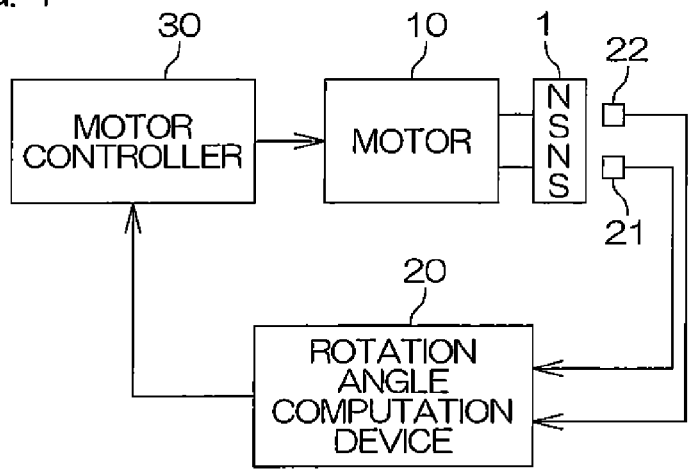
FIG. 1 is a schematic view of an arrangement in which an rotation angle detection device according to a first preferred embodiment of the present invention is applied to an rotation angle detection device for detecting an rotation angle of a rotor of a brushless motor.

FIG. 1 is a schematic view of an arrangement in which a rotation angle detection device according to a first preferred embodiment of the present invention is applied to a rotation angle detection device for detecting a rotation angle of a rotor of a brushless motor.

Figure 2:
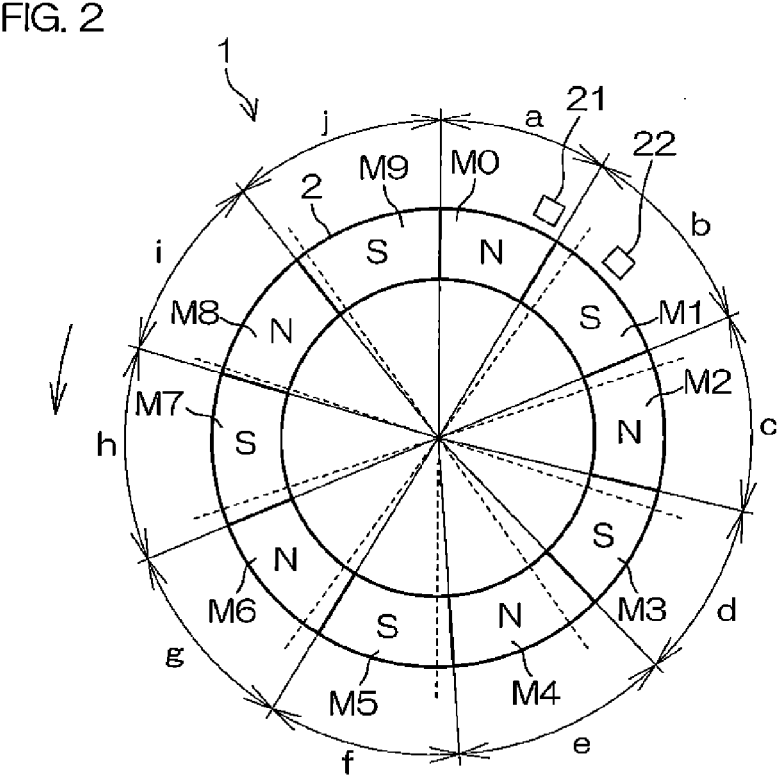
FIG. 2 is a schematic view of an arrangement of a detection rotor.

The rotation angle detection device includes a detection rotor (hereinafter referred to simply as the "rotor 1") that rotates in accordance with rotation of a brushless motor 10. As shown in FIG. 2, the rotor 1 includes a cylindrical magnet 2 having a plurality of magnetic pole pairs corresponding to magnetic pole pairs provided in a rotor of the brushless motor 10. That is, the rotor 1 is provided with a plurality of magnetic poles aligned in a circumferential direction. In the present example, the magnet 2 has five magnetic pole pairs, (M0, M1), (M2, M3), (M4, M5), (M6, M7), and (M8, M9). That is, the magnet 2 has ten magnetic poles M0 to M9.

All of the respective magnetic poles provided in the rotor of the brushless motor 10 have the same length in the circumferential direction. That is, all of the respective magnetic poles provided in the rotor of the brushless motor 10 have the same angular width of 36°. Thus, with the brushless motor 10, an angular width of a single magnetic pole pair is 72° as a mechanical angle and this corresponds to an electrical angle of 360°. On the other hand, as shown in FIG. 2, of the respective magnetic poles M0 to M9 provided in the rotor 1, angular widths (a, c, e, g, and i) of the N pole magnetic poles M0, M2, M4, M6, and M8 differ respectively. That is, magnetized areas differ among the N pole magnetic poles. Of the S pole magnetic poles M1, M3, M5, M7, and M9, the four magnetic poles M1, M3, M5, and M7 besides the magnetic pole M9 differ respectively. The angular width (j) of the magnetic pole M9 is equal to the angular width (f) of the magnetic pole M5.

In the present preferred embodiment, the angular widths of the respective magnetic poles M0 to M9 are set as shown in Table 1. In Table 1, each angular width is expressed by multiplying the mechanical angle corresponding to the angular width by the number of magnetic pole pairs ("5" in the present preferred embodiment). In FIG. 2, broken lines indicate respective regions in a case where the rotor 1 is divided at intervals of 36° in a circumferential direction (180° as the electrical angle).

TABLE 1

| Magnetic Pole | Angular width (deg) |
|---|---|
| M0 | 170 |
| M1 | 165 |

TABLE 1-continued

| Magnetic Pole | Angular width (deg) |
|---|---|
| M2 | 160 |
| M3 | 170 |
| M4 | 165 |
| M5 | 190 |
| M6 | 195 |
| M7 | 195 |
| M8 | 200 |
| M9 | 190 |

At a periphery of the rotor 1, two magnetic sensors 21 and 22 are disposed at an angular interval of a predetermined angle (18° (90° as the electrical angle)) centered at a central rotation axis of the rotor 1. The two magnetic sensors 21 and 22 may be referred to as the first magnetic sensor 21 and the second magnetic sensor 22, respectively, in some cases. As the magnetic sensors, for example, Flail elements, magnetoresistive elements (MR elements), or other elements having a characteristic of changing in electrical characteristic due to action of a magnetic field, may be used.

A direction indicated by the arrow in FIG. 2 shall be deemed to be a positive direction of rotation of the rotor 1. It shall also be deemed that the rotation angle of the rotor 1 increases when the rotor 1 is rotated in the positive direction, and the rotation angle of the rotor 1 decreases when the rotor 1 is rotated in the opposite direction. As shown in FIG. 3, signals of sinusoidal form (hereinafter referred to as "sinusoidal signals") V1 and V2 are output from the respective magnetic sensors 21 and 22 in accordance with the rotation of the rotor 1. In FIG. 3, a rotor angle [deg] of an x-axis expresses an angle obtained by multiplying the mechanical angle by the number of magnetic pole pairs ("5" in the present preferred embodiment). Also, in FIG. 3, near the respective peak values of the sinusoidal signal V1, regions a to j of the magnetic poles sensed by the first magnetic sensor 21 at the respective points are indicated.

When the rotor 1 rotates by an angle corresponding to a single magnetic pole, sinusoidal signals of a half cycle are output from the respective magnetic sensors 21 and 22. However, in the present preferred embodiment, the angular widths of the respective magnetic poles are not of fixed width and thus in the sinusoidal signal output from a single sensor, the half-cycles corresponding to the respective magnetic poles are not fixed. Also, with the exception of the magnetic pole M5 and the magnetic pole M9, the peak values, corresponding to the respective magnetic poles, of the output signals V1 and V2 of the respective magnetic sensors 21 and 22 differ according to magnetic pole.

An absolute rotation angle of the rotor 1 from a predetermined reference position shall be deemed to be the absolute rotation angle (mechanical angle) $\theta_A$ of the rotor 1. An angular range of a single rotation of the rotor 1 shall be divided into five divisions (a+b, c+d, e+f, g+h, and i+j) in correspondence to the angular widths of the five magnetic pole pairs, a start position of each division shall be deemed to be 0°, an end position of each division shall be deemed to be 360°, and an angle corresponding to the absolute rotation angle $\theta_A$ and expressed in the range of 0 to 360° shall be deemed to be a relative rotation angle $\theta_R$ of the rotor 1. In the present preferred embodiment, the angular widths of the five divisions are not of fixed width.

Here, it shall be deemed that the output signal $V1=A1 \cdot \sin \theta_R$ is output from the first magnetic sensor 21 at each division corresponding to each of the five magnetic pole pairs and the output signal $V2=A2 \cdot \cos \theta_R$ is output from the second magnetic sensor 22 at each division corresponding to each of the five magnetic pole pairs. A1 and A2 respectively express amplitudes. However, the amplitude A1 differs according to magnetic pole. Likewise, the amplitude A2 also differs according to magnetic pole. Also, $\theta_R$ expresses the relative rotation angle $\theta_R$ in the corresponding division.

If it is deemed that the amplitudes A1 and A2 of the two output signals V1 and V2 are mutually equal, the relative angle $\theta_R$ of the rotor 1 in the corresponding division can be determined based on the following formula (3) using the two output signals V1 and V2.

$$\theta_R = \tan^{-1}(\sin\theta_R / \cos\theta_R) = \tan^{-1}(V1/V2) \tag{3}$$

Returning to FIG. 1, the output signals V1 and V2 of the respective magnetic sensors 21 and 22 are input into a rotation angle computation device 20. The rotation angle computation device 20 computes the relative rotation angle $\theta_R$ of the rotor 1 based on the output signals V1 and V2 of the respective magnetic sensors 21 and 22. Also, the rotation angle computation device 20 computes the absolute rotation angle (mechanical angle) $\theta_A$ of the rotor 1 based on the obtained relative rotation angle $\theta_R$, etc., and computes an electrical angle $\theta_E$ of the rotor of the brushless motor based on the obtained absolute rotation angle $\theta_A$ of the rotor 1. The rotation angle computation device 20 is made up of a microcomputer, for example, and includes a CPU (central processing unit) and a memory (ROM, RAM, rewritable nonvolatile memory, etc.).

The electrical angle computed by the rotation angle computation device 20 is provided to a motor controller 30. The motor controller 30 controls the brushless motor 10 based on the electrical angle $\theta_E$ provided from the rotation angle computation device 20 and a predetermined command value.

Operation of the rotation angle computation device 20 shall now be described. Amplitude compensation tables are stored according to the magnetic sensors 21 and 22 in the rewritable nonvolatile memory of the rotation angle computation device 20.

FIG. 4A shows an example of contents of the amplitude compensation table (may hereinafter be referred to as the "first table") for the first magnetic sensor 21. In accordance with each of magnetic pole numbers 0 to 9 of the respective magnetic poles M0 to M9, a peak value (maximum value or minimum value) of the output signal V1 of the first magnetic sensor 21 that corresponds to the magnetic pole, an angular width [deg] of the magnetic pole, and a compensation gain G1 are stored in the first table. As described with Table 1, the value of the angular width is obtained by multiplying the mechanical angle corresponding to the angular width by the number of magnetic pole pairs ("5" in the present preferred embodiment). The compensation gain G1 is a gain for compensating variation according to magnetic pole of the amplitude of the first magnetic sensor 21.

The amplitude compensation gain G1 for any magnetic pole is determined based on the following formula (4) using the peak value (maximum value or minimum value) of the output signal V1 of the first magnetic sensor 21 that corresponds to the magnetic pole and a reference amplitude. The reference amplitude is, for example, a value corresponding to a peak value (absolute value) of the output signal V1 of the first magnetic sensor 21 that corresponds to a magnetic pole for which the angular width (mechanical angle×number of magnetic pole pairs) is 180°. The reference amplitude is set in advance and is "500" in the present example.

$$G1 = \text{Reference amplitude}/|\text{Peak value}| \tag{4}$$

FIG. 4B shows an example of contents of the amplitude compensation table (may hereinafter be referred to as the "second table") for the second magnetic sensor 22. In accordance with each of magnetic pole numbers 0 to 9 of the respective magnetic poles M0 to M9, the peak value (maximum value or minimum value) of the output signal V2 of the second magnetic sensor 22 that corresponds to the magnetic pole, the angular width [deg] of the magnetic pole, and a compensation gain G2 are stored in the second table. The compensation gain G2 is a gain for compensating variation according to magnetic pole of the amplitude of the second magnetic sensor 21. Although in FIG. 4B, the peak values of the second magnetic sensor 22 with respect to the respective magnetic poles are of the same values as the peak values of the first magnetic sensor 21 with respect to the corresponding magnetic poles, the values may actually differ from each other.

The compensation gain G2 for any magnetic pole is determined based on the following formula (5) using the peak value (maximum value or minimum value) of the output signal V2 of the second magnetic sensor 22 that corresponds to the magnetic pole and a reference amplitude. The reference amplitude is, for example, a value corresponding to a peak value (absolute value) of the output signal V2 of the second magnetic sensor 22 that corresponds to a magnetic pole for which the angular width (mechanical angle×number of magnetic pole pairs) is 180°. The reference amplitude is set in advance and is "500" in the present example.

$$G2 = \text{Reference amplitude}/|\text{peak value}| \tag{5}$$

The storing of the peak values and the compensation gains in the amplitude compensation tables may be performed before shipment of the brushless motor 10 or may be performed by detecting peak values during motor control after shipment of the brushless motor 10. The peak values and the compensation gains stored in the amplitude compensation tables may be determined from data of a single cycle or may be determined from average values of data of a plurality of cycles.

Also, two types of magnetic pole identification tables (which may hereinafter be referred to as the "third table" and the "fourth table") are stored in the rewritable nonvolatile memory in the rotation angle computation device 20. In the third table, data indicating the pole number of a magnetic pole sensed by the second magnetic sensor 22 when a peak value with respect to a magnetic pole is detected by the first magnetic sensor 21 is stored according to each magnetic pole (each magnetic pole number) for which the peak value is detected by the first magnetic sensor 21. In the fourth table, data indicating the pole number of a magnetic pole sensed by the first magnetic sensor 21 when a peak value with respect to a magnetic pole is detected by the second magnetic sensor 22 is stored according to each magnetic pole (each magnetic pole number) for which the peak value is detected by the second magnetic sensor 22. The third table and the fourth table are prepared based on the positions and the angular interval of the two magnetic sensors 21 and 22 and the arrangement of the rotor 1.

Upon detecting a peak value from the output signal V1 or V2 of the first or second magnetic sensor 21 or 22, the rotation angle computation device 20 identifies, based on the amplitude compensation table (the first table or the second table) corresponding to the magnetic sensor with which the peak value is detected, the pole number of the magnetic pole sensed by the magnetic sensor. The peak value of a sensor signal changes in accordance with temperature characteristics of the magnet (the peak value decreases as a temperature of the magnet increases) and thus in the above process, the table value may be compensated by multiplying the peak value of the amplitude compensation table by a temperature coefficient (a coefficient that decreases as the temperature increases) of the magnet and the pole number of the magnetic pole may be identified based on the detected peak value and the compensated table value.

In the present preferred embodiment, the peak value corresponding to the magnetic pole M5 and the peak value corresponding to the magnetic pole M9 are the same and thus when the peak value corresponding to the magnetic pole M5 or the magnetic pole M9 is detected by one of either magnetic sensor, the rotation angle computation device 20 cannot identify the pole number of the magnetic pole sensed by the magnetic sensor. The rotation angle computation device 20 thus identifies the pole number of the magnetic pole sensed by either magnetic sensor when a peak value corresponding to a magnetic pole other than magnetic pole M5 or M9 is detected by the magnetic sensor.

Based on the identified pole number and the third or fourth table (magnetic pole identification table), the rotation angle computation device 20 identifies the pole number of the magnetic pole sensed by the other magnetic sensor. For example, when the pole number of the magnetic pole sensed by the first magnetic sensor 21 is identified based on the first table, then, based on the identified pole number and the third table, the pole number of the magnetic pole sensed by the second magnetic sensor 22 is identified. On the other hand, when the pole number of the magnetic pole sensed by the second magnetic sensor 22 is identified based on the second table, then, based on the identified pole number and the fourth table, the pole number of the magnetic pole sensed by the first magnetic sensor 21 is identified.

The pole numbers of the magnetic poles sensed by the respective magnetic sensors 21 and 22 are thereby identified, and the rotation angle computation device 20 thus compensates the output signals V1 and V2 of the respective magnetic sensors 21 and 22 using the compensation gains G1 and G2 corresponding to the magnetic poles being sensed respectively. The rotation angle computation device 20 then computes the relative rotation angle $\theta_R$ of the rotor 1 based on the amplitude-compensated output signals. Also, the rotation angle computation device 20 computes the absolute rotation angle $\theta_A$ based on the obtained relative rotation angle $\theta_R$. The rotation angle computation device 20 then computes the electrical angle $\theta_E$ of the brushless motor 10 based on the obtained absolute rotation angle $\theta_A$.

Thereafter, each time a peak value is detected from the output of the first or second magnetic sensor 21 or 22, the rotation angle computation device 20 updates the pole number already identified for the one magnetic sensor for which the peak value is detected and compensates the output signal of the magnetic sensor using the compensation gain corresponding to the updated pole number. The rotation angle computation device 20 then computes the relative rotation angle $\theta_R$ and the absolute rotation angle $\theta_A$ of the rotor 1 and the electrical angle $\theta_E$ of the brushless motor 10 in the same manner as described above.

Figure 5:
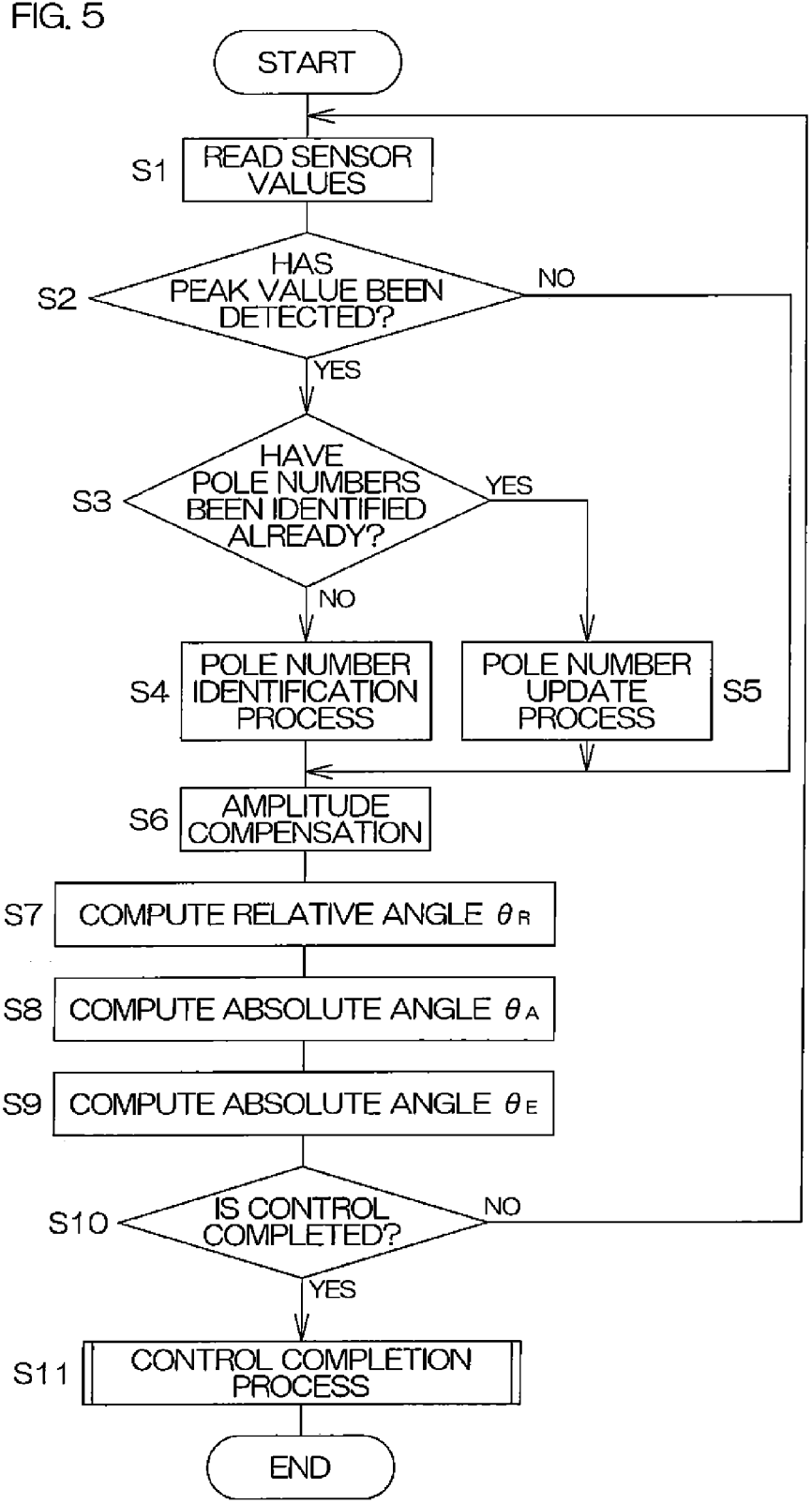
FIG. 5 is a flowchart of a procedure of a rotation angle computation process performed by a rotation angle computation device.

FIG. 5 is a flowchart of a procedure of a rotation angle computation process performed by the rotation angle computation device 20.

When the motor controller 30 is started up, the rotation angle computation device 20 reads the output signals (sensor values) V1 and V2 of the respective magnetic sensors 21 and 22 (step S1). Sensor values of a plurality of times of reading, from the sensor values read a predetermined number of times previously up to the most recently read sensor values, are stored in the memory (for example, RAM) of the rotation angle computation device 20. Based on the sensor values stored in the memory, the rotation angle computation device 20 judges, for each of the sensor values V1 and V2 and based on the sensor values stored in the memory, whether or not a peak value (extremum) has been detected (step S2). The judgment process of step S2 may be referred to hereinafter as the peak value detection process. Specifically, the rotation angle computation device 20 judges that a peak value (maximum value) is detected and identifies the maximum value when a sensor value changes from an increasing trend to a decreasing trend. Also, the rotation angle computation device 20 judges that a peak value (minimum value) is detected and identifies the minimum value when a sensor value changes from a decreasing trend to an increasing trend.

If a peak value is not detected in step S2 (step S2: NO), step S6 is entered. On the other hand, if a peak value is detected in step S2 (step S2: YES), the rotation angle computation device 20 judges whether or not the magnetic poles sensed by the respective magnetic sensors have already been identified by a pole number identification process of step S4, to be described below, after the startup of the controller (step S3). If the magnetic poles sensed by the respective magnetic sensors have not already been identified (step S3: NO), the rotation angle computation device 20 performs the pole number identification process (step S4). That is, the rotation angle computation device 20 identifies the magnetic poles respectively sensed by the respective magnetic sensors 21 and 22.

Specifically, based on the peak value (maximum value or minimum value) detected by the peak value detection process of step S2 and the contents of the amplitude compensation table (the first or the second table) corresponding to the magnetic sensor that outputted the peak value, the rotation angle computation device 20 first identifies the magnetic pole sensed by the magnetic sensor. That is, the rotation angle computation device 20 identifies the pole number corresponding to the peak value, which, among the plurality of peak values stored in the amplitude compensation table, is closest to the peak value detected by the peak value detection process, as the pole number of the magnetic pole sensed by the magnetic sensor.

However, in the case where the pole number corresponding to the peak value closest to the peak value detected by the peak value detection process is the pole number corresponding to the magnetic pole M5 or the magnetic pole M9, the rotation angle computation device 20 does not identify the magnetic pole sensed by the magnetic sensor.

In the case where the pole number of the magnetic pole sensed by the magnetic sensor could be identified, the rotation angle computation device 20 identifies, based on the pole number of the magnetic pole sensed by the magnetic sensor and the third table or the fourth table (magnetic pole identification table), the magnetic pole sensed by the other magnetic sensor. The magnetic poles sensed by the respective magnetic sensors 21 and 22 are thereby identified. When the process of step S4 is completed, step S6 is entered.

If in step S3, it is judged that pole numbers of the magnetic poles sensed by the respective sensors 21 and 22 have been identified by the pole number identification process of step S4 performed after controller startup (step S3: YES), the rotation angle computation device 20 performs a pole number update process (step S5). Specifically, the rotation angle computation device 20 updates, based on the direction of rotation of the rotor 1, the pole number already identified for the magnetic sensor for which the peak value was detected by the peak value detection process of step S2. More specifically, the rotation angle computation device 20 changes the pole num-ber already identified for the magnetic sensor to a pole number that is greater by just 1 or a pole number that is less by just 1 in accordance with the direction of rotation of the rotor 1.

If the direction of rotation of the rotor 1 is the positive direction (direction indicated by the arrow in FIG. 2), the already identified pole number is updated to a pole number that is greater by just 1, and if the direction of rotation of the rotor 1 is the opposite direction, the already identified pole number is updated to a pole number that is less by just 1. However, for the pole number "0," the pole number that is less by just 1 is "9." Also, for the pole number "9," the pole number that is greater by just 1 is "0." When the process of step S5 is completed, step S6 is entered. The direction of rotation of the rotor 1 may be judged, for example, based on phases of the output signals V1 and V2 of the respective magnetic sensors 21 and 22. Specifically, if V2 is leading in phase with respect to V1 (if the peak value for the same magnetic pole is detected from V2 and then detected from V1), it is judged that the direction of rotation of the rotor 1 is the positive direction. On the other hand, if V1 is leading in phase with respect to V2 (if the peak value for the same magnetic pole is detected from V1 and then detected from V2), it is judged that the direction of rotation of the rotor 1 is the opposite direction.

In step S6, the rotation angle computation device 20 performs amplitude compensation on the sensor values V1 and V2 read in step S1. Specifically, the rotation angle computation device 20 reads, from the first table and the second table, the amplitude compensation gains G1 and G2 corresponding to the pole numbers currently identified for the respective magnetic sensors 21 and 22. The rotation angle computation device 20 then uses the gains G1 and G2 read from the first table and the second table to respectively compensate the sensor values V1 and V2 read in step S1. If V1' and V2' are the compensated sensor values, V1' and V2' are respectively expressed by the following formulae (6) and (7).

$$V1'=V1 \times G1 \qquad (6)$$

$$V2'=V1 \times G2 \qquad (7)$$

However, from the startup of the controller until the detection of a peak value, the magnetic poles sensed by the respective magnetic sensors 21 and 22 are not identified and thus step S7 is entered without the compensation of the sensor values V1 and V2 being performed in step S6. Step S7 is also entered without the compensation of the sensor values V1 and V2 being performed in step S6 if in a case where step S6 is entered from step S4, the pole numbers of the magnetic poles sensed by the two magnetic sensors 21 and 22 are not identified in the pole number identification process of step S4.

When the amplitude compensation of step S6 has been performed, the rotation angle computation device 20 computes the relative angle $\theta_R$ of the rotor 1 (step S7). Specifically, the rotation angle computation device 20 computes the relative angle $\theta_R$ of the rotor 1 based on the following formula (8).

$$\theta_R = \tan^{-1}(V1'/V2') \qquad (8)$$

Next, based on the relative angle $\theta_R$ of the rotor 1 computed in step S7, the pole number of the magnetic pole detected by the magnetic sensor 21, and the contents of the amplitude compensation table, the rotation angle computation device 20 computes the absolute angle (mechanical angle) $\theta_A$ of the rotor (step S8). Specifically, the rotation angle computation device 20 identifies, based on the pole number of the magnetic pole sensed by the magnetic sensor 21, the magnetic pole sensed by the magnetic sensor 21. The angular width W corresponding to the identified magnetic pole is then determined. For example, if the magnetic pole sensed by the magnetic sensor 21 is the first magnetic pole M0 among the ten magnetic poles, the angular width W corresponding to the magnetic pole is 170 [deg].

The relative angle $\theta_R$ of the rotor 1 computed in step S7 is an angle computed with the angular width W of the magnetic pole sensed by the magnetic sensor 21 being set to 180°. The rotation angle computation device 20 thus converts (phase-compensates), based on the following formula (9), the relative angle $\theta_R$ of the rotor 1 computed in step S7 to a relative angle $\theta_R'$ that is in accordance with the angular width of the region of the magnetic pole sensed by the magnetic sensor 21.

$$\theta_R' = \theta_R \times (W/180°) \qquad (9)$$

The rotation angle computation device 20 then computes the absolute angle (mechanical angle) $\theta_A$ of the rotor 1 based on the magnetic pole sensed by the magnetic sensor 21 and the converted relative angle $\theta_R'$. For example, if the magnetic pole sensed by the magnetic sensor 21 is the first magnetic pole M0, the absolute angle $\theta_A$ of the rotor 1 matches the converted relative angle $\theta_R'$. That is, $\theta_A = \theta_R'/5$. Here, 5 is the number of magnetic pole pairs.

If the magnetic pole sensed by the magnetic sensor 21 is the second magnetic pole M1, $\theta_A = \{\theta_R' + (\text{angular width of the first magnetic pole M0})\}/5$. As described with Table 1, the angular width is a value with which the mechanical angle corresponding to the angular width is multiplied by the number of magnetic pole pairs ("5" in the present preferred embodiment). If the magnetic pole sensed by the magnetic sensor 21 is the third magnetic pole M2, $\theta_A = \{\theta_R' + (\text{total of the angular widths of the first and second magnetic poles M0 and M1})\}/5$. If the magnetic pole sensed by the magnetic sensor 21 is the fourth magnetic pole M3, $\theta_A = \{\theta_R' + (\text{total of the angular widths of the first to third magnetic poles M0 to M2})\}/5$. If the magnetic pole sensed by the magnetic sensor 21 is the fifth magnetic pole M4, $\theta_A = \{\theta_R' + (\text{total of the angular widths of the first to fourth magnetic poles M0 to M3})\}/5$.

If the magnetic pole sensed by the magnetic sensor 21 is the sixth magnetic pole M5, $\theta_A = \{\theta_R' + (\text{total of the angular widths of the first to fifth magnetic poles M0 to M4})\}/5$. If the magnetic pole sensed by the magnetic sensor 21 is the seventh magnetic pole M6, $B_A = \{B_R' + (\text{total of the angular widths of the first to sixth magnetic poles M0 to M5})\}/5$. If the magnetic pole sensed by the magnetic sensor 21 is the eighth magnetic pole M7, $\theta_A = \{\theta_R' + (\text{total of the angular widths of the first to seventh magnetic poles M0 to M6})\}/5$. If the magnetic pole sensed by the magnetic sensor 21 is the ninth magnetic pole M8, $\theta_A = \{\theta_R' + (\text{total of the angular widths of the first to eighth magnetic poles M0 to M7})\}/5$. If the magnetic pole sensed by the magnetic sensor 21 is the tenth magnetic pole M9, $\theta_A = \{\theta_R' + (\text{total of the angular widths of the first to ninth magnetic poles M0 to M8})\}/5$.

When the absolute angle $\theta_A$ of the rotor 1 has thus been computed, the rotation angle computation device 20 computes the electrical angle $\theta_E$ (step S9). Specifically, if n is the number (1 to 5) of the magnetic pole pair (M0, M1), (M2, M3), (M4, M5), (M6, M7), or (M8, M9) sensed by the magnetic sensor 21, the rotation angle computation device 20 computes the electrical angle $\theta_E$ based on the following formula (10) and provides it to the motor controller 30.

$$\theta_E = 5\theta_A - \{360 \times (n-1)\} \qquad (10)$$

Thereafter, the rotation angle computation device 20 judges whether or not motor control has been completed (step S10). If the motor control has not been completed (step S10: NO), a return to step S1 is performed. If the motor control has been completed (step S10: YES), the rotation angle computation device 20 performs a control completion process (step S11).

Figure 6:
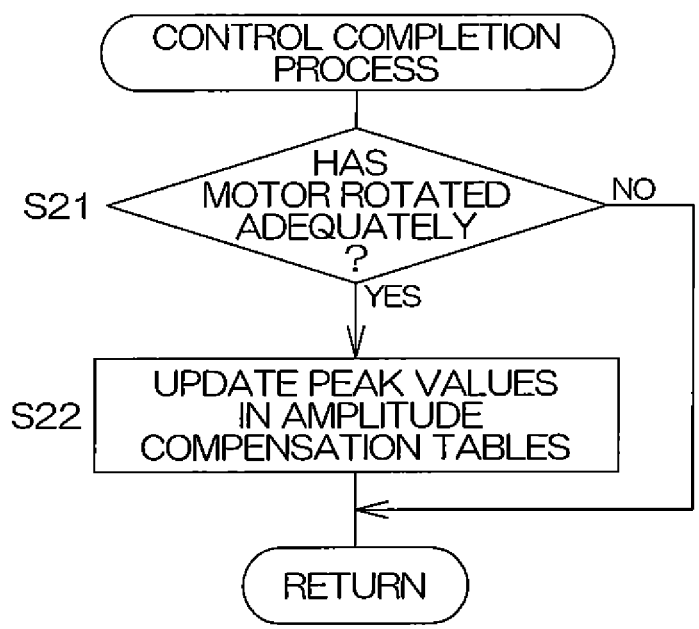
FIG. 6 is a flowchart of an example of a control completion process.

FIG. 6 is a flowchart of an example of the control completion process.

In the control completion process, the rotation angle computation device 20 judges whether or not the brushless motor 10 has rotated adequately during the present motor control period (step S21). Specifically, the rotation angle computation device 20 judges whether or not the number of rotations of the motor 10 during the present motor control period is no less than a predetermined number of rotations. If it is judged that the brushless motor 10 has rotated adequately (step S21: YES), the peak values corresponding to the respective pole numbers in the amplitude compensation tables (the first table and the second table) are updated by the most recently detected peak values as the peak values corresponding to the pole numbers (step S22). The control completion process is then completed.

Although in the preferred embodiment, the angular width (f) of the S-pole magnetic pole M5 and the angular width (j) of the magnetic pole M9 are equal, the angular widths of the respective S-pole magnetic poles M1, M3, M5, M7, and M9 may differ respectively in the same manner as the N-pole magnetic poles M0, M2, M4, M6, and M8.

Figure 7:
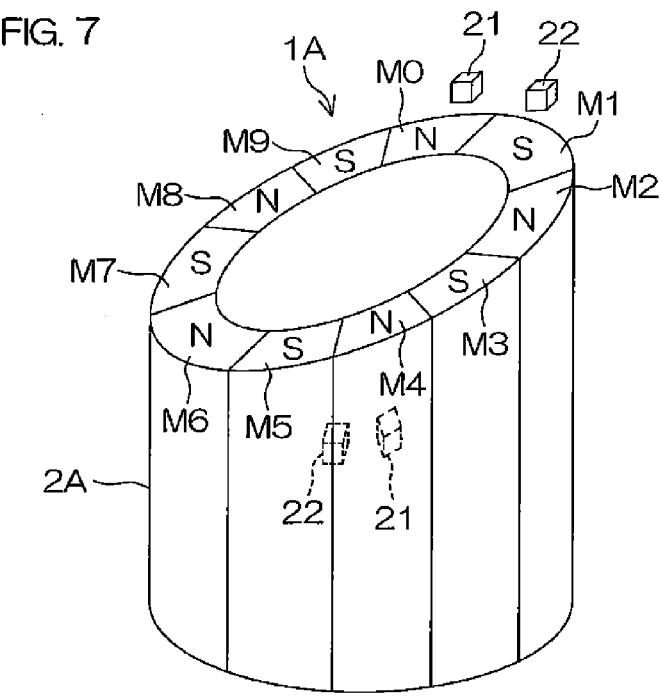
FIG. 7 is a perspective view of a detection rotor used in a rotation angle detection device according to a second preferred embodiment of the present invention.
Figure 8:
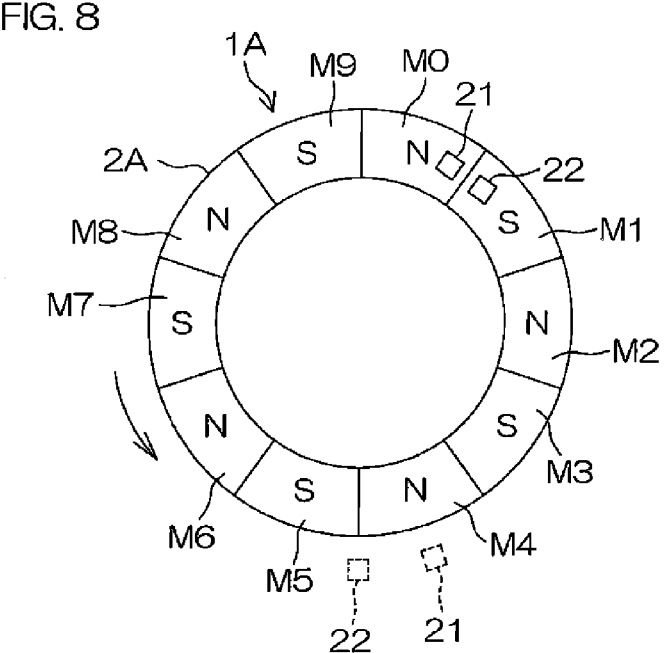
FIG. 8 is a plan view of the detection rotor used in the rotation angle detection device according to the second preferred embodiment of the present invention.

FIG. 7 and FIG. 8 show a detection rotor used in a rotation angle detection device according to a second preferred embodiment of the present invention. FIG. 7 is a perspective view of the detection rotor and FIG. 8 is a view from an end surface side of the detection rotor.

The detection rotor 1A has a magnet 2A with which one end side of a cylindrical magnetic has been cut obliquely with respect to an axial direction. That is, one end side of the magnet 2A is an end surface of flat form (flat end surface) and the other end side is an end surface of inclined form (inclined end surface). As viewed from the end surface side, the magnet 2A is magnetized with ten magnetic poles M0 to M9 at equiangular intervals in a circumferential direction. The respective magnetic poles M0 to M9 differ in length in a rotation axis direction of the detection rotor 1A. In a case where the flat end surface of the magnet 2A is disposed at the lower side, heights of the respective magnetic poles M0 to M9 differ. As indicated by solid lines in FIG. 7 and FIG. 8, at an outer side in a direction opposite to the direction toward the flat end surface with respect to the inclined end surface of the rotor 1A, two magnetic sensors 21 and 22 are disposed at an angular interval of a predetermined angle (18° (90° as the electrical angle)) centered at a central rotation axis of the rotor 1A so as to face the inclined end surface of the rotor 1A.

When the rotor 1A rotates, the peak values according to magnetic pole of the output signals V1 and V2 of the respective magnetic sensors 21 and 22 differ according to magnetic pole because the distances between the magnetic sensors 21 and 22 and the facing magnetic poles among the magnetic poles M0 to M9 differ according to magnetic pole. The rotation angle computation device 20 can thus perform amplitude compensation of the output signals V1 and V2 of the respective magnetic sensors 21 and 22 by the same method as that of the first preferred embodiment, that is, by performing substantially the same process as the process shown in FIG. 5.

In the present preferred embodiment, the respective magnetic poles M0 to M9 are provided at equiangular intervals and thus the relative angle $\theta_R$ computed based on formula (8) in step S7 of FIG. 5 matches the electrical angle $\theta_E$ of the brushless motor 10. Thus, in the present preferred embodiment, there is no need to perform the processes of step S8 and step S9 in FIG. 5.

The magnetic sensors 21 and 22 may be disposed near a side surface (outer peripheral surface) of the rotor 1A as indicated by broken lines in FIG. 7 and FIG. 8. However, the magnetic sensors 21 and 22 must be disposed at a side of positions closer to the flat end surface of the rotor 1A with respect to the position of the inclined end surface of the magnetic pole of shortest length in the rotation axis direction of the rotor 1A. When the rotor 1A is rotated, the peak values according to magnetic pole of the output signals V1 and V2 of the respective magnetic sensors 21 and 22 differ according to magnetic pole because the sizes of the magnetic poles that the magnetic sensors 21 and 22 face differ according to magnetic pole. The rotation angle computation device 20 can thus perform amplitude compensation of the output signals V1 and V2 of the respective magnetic sensors 21 and 22 by the same method as that of the first preferred embodiment.

The relative angle $\theta_R$ computed based on formula (8) in step S7 of FIG. 5 matches the electrical angle $\theta_E$ of the brushless motor 10 in the present case as well because the respective magnetic poles M0 to M9 are provided at equiangular intervals. Thus, in the present preferred embodiment, there is no need to perform the processes of step S8 and step S9 in FIG. 5.

Figure 9:
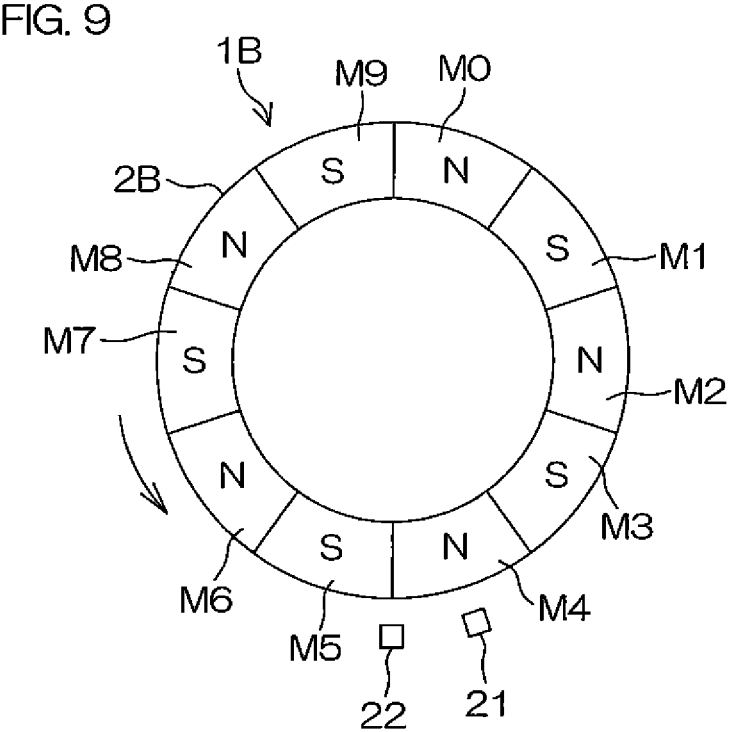
FIG. 9 is a view from an end surface side of a detection rotor used in a rotation angle detection device according to a third preferred embodiment of the present invention.
Figure 10:
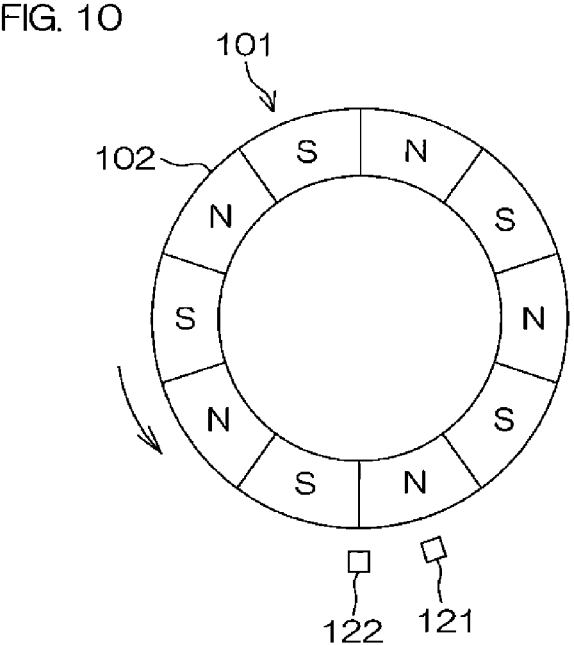
FIG. 10 is a schematic view for describing a rotation angle detection method according to a conventional rotation angle detection device.
Figure 11:
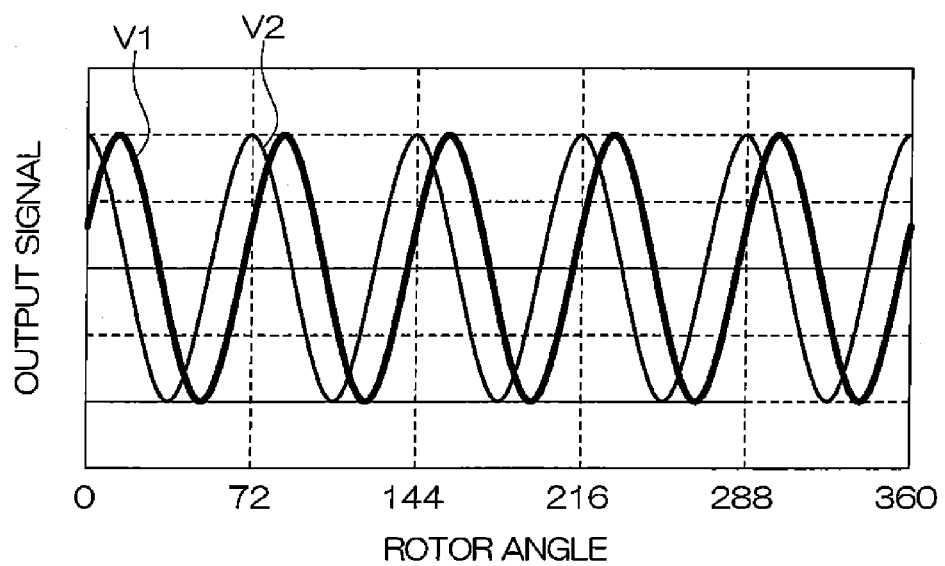
FIG. 11 is a schematic view of an output signal waveform of a first magnetic sensor and an output signal waveform of a second magnetic sensor.

FIG. 9 shows a detection rotor used in a rotation angle detection device according to a third preferred embodiment of the present invention.

The detection rotor 1B has a cylindrical magnet 2B. As viewed from the end surface side, the magnet 2B is magnetized with ten magnetic poles M0 to M9 at equiangular intervals in a circumferential direction. However, magnitudes of magnetic forces of the respective magnetic poles M0 to M9 differ greatly according to magnetic pole. That is, the magnitudes of the magnetic forces of the respective magnetic poles M0 to M9 are differed intentionally.

When the rotor 1B rotates, the peak values according to magnetic pole of the output signals V1 and V2 of the respective magnetic sensors 21 and 22 differ according to magnetic pole because the magnitudes of the magnetic forces of the magnetic poles M0 to M9 differ greatly according to magnetic pole. The rotation angle computation device 20 can thus perform amplitude compensation of the output signals V1 and V2 of the respective magnetic sensors 21 and 22 by the same method as that of the first preferred embodiment, that is, by performing substantially the same process as the process shown in FIG. 5.

In the present preferred embodiment, the respective magnetic poles M0 to M9 are provided at equiangular intervals and thus the relative angle $\theta_R$ computed based on formula (8) in step S7 of FIG. 5 matches the electrical angle $\theta_E$ of the brushless motor 10. Thus, in the present preferred embodiment, there is no need to perform the processes of step S8 and step S9 in FIG. 5.

In the first preferred embodiment, the magnetic poles sensed by the respective magnetic sensors can be identified at the point at which a peak value corresponding to a magnetic pole other than the magnetic poles M5 and M9 is detected from the output signal V1 or V2 of either magnetic sensor 21 or 22 after startup of the brushless motor 10. Also, in each of the second and third preferred embodiments, the magnetic poles sensed by the respective magnetic sensors can be identified at the point at which a peak value of any magnetic pole is detected from the output signal V1 or V2 of either magnetic sensor 21 or 22 after startup of the brushless motor 10. The magnetic poles sensed by the respective magnetic sensors 21 and 22 can thus be identified at an early stage immediately after startup of the brushless motor 10. The output signals V1 and V2 of the respective magnetic sensors 21 and 22 can thus be compensated (amplitude-compensated) in accordance with the magnetic poles sensed by the magnetic sensors at an early stage immediately after startup of the brushless motor 10. Consequently, rotation angle detection of high precision can be performed from an early stage immediately after startup of the brushless motor 10.

Although the first to third preferred embodiments of the present invention have been described above, the present invention may also be put into practice in other embodiments as well. For example, although in each of the preferred embodiments described above, each of the rotors 1, 1A, and 1B has magnetic pole characteristics such that a peak value with respect to each magnetic pole differs from any of the peak values with respect to the magnetic poles besides the magnetic pole, it suffices that a peak value with respect to at least a single magnetic pole differ from any of the peak values with respect to the other magnetic poles. For example, in a case where the detection rotor has magnetic pole characteristics such that a peak value with respect to a single magnetic pole (hereinafter referred to as the "reference magnetic pole") differs from any of the peak values with respect to the other magnetic poles, the magnetic poles sensed by the respective magnetic sensors 21 and 22 can be identified at the point at which the extremum corresponding to the reference magnetic pole is detected from the startup of the brushless motor. A possibility that the magnetic poles sensed by the respective magnetic sensors 21 and 22 can be identified before the detection rotor makes a single rotation after startup of the brushless motor is thereby made high. That is, it becomes possible to identify the magnetic poles sensed by the respective magnetic sensors 21 and 22 at an early stage immediately after startup of the brushless motor.

Also, the present invention may be applied to cases of detecting a rotation angle of a rotating body other than a rotor of a brushless motor.

While preferred embodiments of the present invention have been described in detail above, these are merely specific examples for clarifying the technical contents of the present invention, the present invention should not be interpreted as being limited to the specific examples, and the scope of the present invention is to be limited solely by the attached claims.

The present application corresponds to Japanese Patent Application No. 2010-46719 filed in the Japan Patent Office on Mar. 3, 2010 and the entire disclosure of the present application is incorporated herein by reference.

REFERENCE SYMBOLS LIST 1, 1A, 1B . . . Rotor
21, 22 . . . Magnetic sensor
10 . . . Brushless motor
M0-M9 . . . Magnetic pole

The invention claimed is:

1. An rotation angle detection device comprising: a detection rotor rotating in accordance with rotation of a rotating body and provided with a plurality of magnetic poles; and first and second magnetic sensors respectively outputting first and second alternating signals having a predetermined phase difference in accordance with the rotation of the detection rotor; and detecting an rotation angle of the rotating body based on the output signals of the magnetic sensors, the detection rotor having magnetic pole characteristics such that an extremum of each alternating signal with respect to at least one magnetic pole among the plurality of magnetic poles differs distinguishably from any of the extrema of the alternating signal with respect to the other magnetic poles, and the rotation angle detection device further comprising:
a detection unit configured to detect the extrema of the respective alternating signals;
a compensation unit configured to identify the magnetic poles sensed by the respective magnetic sensors based on the extrema detected by the detecting unit and extrema data set in advance and compensating amplitudes of the respective alternating signals in accordance with the identified magnetic poles; and
a rotation angle computation unit configured to compute the rotation angle of the rotating body based on the respective amplitude-compensated alternating signals.

2. The rotation angle detection device according to claim 1, wherein the detection rotor has a plurality of magnetic poles disposed in a circumferential direction and has the magnetic pole characteristics by magnetic pole area differences being provided among the magnetic poles.

3. The rotation angle detection device according to claim 1, wherein the detection rotor has a plurality of magnetic poles disposed at equiangular intervals in the circumferential direction and has the magnetic pole characteristics by differences in length in a rotation axis direction of the detection rotor being provided among the magnetic poles.

4. The rotation angle detection device according to claim 1, wherein the detection rotor has a plurality of magnetic poles that are equal in length in the rotation axis direction of the detection rotor disposed at equiangular intervals in the circumferential direction and has the magnetic pole characteristics by differences in magnitude of magnetic force being provided among the magnetic poles.

5. The rotation angle detection device according to claim 1, wherein the detection rotor has a plurality of magnetic poles disposed in a circumferential direction and has the magnetic pole characteristics by angular width differences being provided among the magnetic poles, the rotation angle computation unit comprises a phase compensation unit, and the phase compensation unit comprises a unit configured to compute a relative angle of the detection rotor from the respective amplitude-compensated alternating signals and compensate the computed relative angle to a relative angle that is in accordance with the angular width of the magnetic pole sensed by one of the magnetic sensors determined in advance.

6. The rotation angle detection device according to claim 2, wherein the detection rotor has a plurality of magnetic poles disposed in a circumferential direction and has the magnetic pole characteristics by angular width differences being provided among the magnetic poles, the rotation angle computation unit comprises a phase compensation unit, and the phase compensation unit comprises a unit configured to compute a relative angle of the detection rotor from the respective amplitude-compensated alternating signals and compensate the computed relative angle to a relative angle that is in accordance with the angular width of the magnetic pole sensed by one of the magnetic sensors determined in advance.

* * * * *